(12) United States Patent
Borsos et al.

(10) Patent No.: US 11,244,568 B2
(45) Date of Patent: Feb. 8, 2022

(54) COLLISION PREVENTION SYSTEM AND METHOD

(71) Applicant: Telefonaktiebolaget LM Ericsson (publ), Stockholm (SE)

(72) Inventors: Tamas Borsos, Budapest (HU); Péter Hága, Budapest (HU); Zsófia Kallus, Budapest (HU); Zsolt Kenesi, Budapest (HU); Mate Szebenyei, Maglod (HU); Peter Vaderna, Budapest (HU); András Veres, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 16/652,443

(22) PCT Filed: Nov. 24, 2017

(86) PCT No.: PCT/EP2017/080345
§ 371 (c)(1),
(2) Date: Mar. 31, 2020

(87) PCT Pub. No.: WO2019/101330
PCT Pub. Date: May 31, 2019

(65) Prior Publication Data
US 2020/0286384 A1    Sep. 10, 2020

(51) Int. Cl.
*G08G 1/16* (2006.01)
*B60W 60/00* (2020.01)
(Continued)

(52) U.S. Cl.
CPC ............. *G08G 1/164* (2013.01); *B60Q 5/006* (2013.01); *B60W 60/007* (2020.02);
(Continued)

(58) Field of Classification Search
CPC .......... G08G 1/164; G08G 1/166; G08G 1/20; B60W 60/0016; B60W 60/0017; B60W 60/007; B60Q 5/006
See application file for complete search history.

(56) References Cited

U.S. PATENT DOCUMENTS 8,954,252 B1    2/2015   Urmson et al.
9,637,965 B1 *  5/2017   Kothari ................. B60J 5/0493
(Continued)

FOREIGN PATENT DOCUMENTS

WO    2017120336 A2    7/2017

*Primary Examiner* — Hussein Elchanti
(74) *Attorney, Agent, or Firm* — Coats & Bennett, PLLC

(57) ABSTRACT

We generally describe a collision prevention system (100) comprising: a localization system (402) for determining positions of an autonomous vehicle (104) and a human (106); and a collision determination unit (404) coupled to or in communication with the localization system (402), wherein the collision determination unit (404) is configured to determine, based on the determined positions of the autonomous vehicle (104) and the human (106), whether a predefined condition for an anticipated collision of the autonomous vehicle (104) with the human (106) is met; wherein the collision prevention system (100) is configured to: lock the autonomous vehicle (104) if the predefined condition is met; alert the human (106) for whom the predefined condition for colliding with the autonomous vehicle (104) is met; and allow unlocking of the autonomous vehicle (104) to be performed or initialized by the alerted human (106) only.

20 Claims, 4 Drawing Sheets

(51) Int. Cl.
 *B60Q 5/00* (2006.01)
 *G08G 1/00* (2006.01)
(52) U.S. Cl.
 CPC .... *B60W 60/0016* (2020.02); *B60W 60/0017* (2020.02); *G08G 1/166* (2013.01); *G08G 1/20* (2013.01)

(56) References Cited

U.S. PATENT DOCUMENTS

| | | |
|---|---|---|
| 10,190,357 B2 * | 1/2019 | Kothari ................... E05F 15/76 |
| 2011/0010023 A1 | 1/2011 | Kunzig et al. |
| 2011/0093134 A1 | 4/2011 | Emanuel et al. |
| 2011/0260848 A1 * | 10/2011 | Rodriguez Barros . B60Q 1/323 340/438 |
| 2013/0187792 A1 | 7/2013 | Egly |
| 2014/0049058 A1 * | 2/2014 | Kudoh ................... E05B 79/06 292/336.3 |
| 2014/0313335 A1 * | 10/2014 | Koravadi ........... H04N 5/23216 348/148 |
| 2015/0002288 A1 * | 1/2015 | Lee ......................... B60Q 1/46 340/471 |
| 2016/0062345 A1 | 3/2016 | Stubbs et al. |
| 2016/0290019 A1 * | 10/2016 | Nagata ................... E05B 77/06 |
| 2017/0089114 A1 * | 3/2017 | Rider ................... G01L 19/083 |
| 2017/0248965 A1 | 8/2017 | Wellman et al. |
| 2020/0286384 A1 * | 9/2020 | Borsos ................... G08G 1/164 |

* cited by examiner

COLLISION PREVENTION SYSTEM AND METHOD

TECHNICAL FIELD

The present disclosure generally relates to a collision prevention system and method, as well as a computer program product comprising program code portions for performing the collision prevention method.

BACKGROUND

Various indoor industrial settings may benefit from the use of autonomously driven vehicles, such as, for example, factories, logistics centers, mines etc. However, compared to common practices implemented in the past, such settings evolve into dynamically changing, modular formations.

Currently known autonomous driving solutions operate in constant environments or follow dedicated, closed routes. On a smaller scale, simple robotic vehicles can move along fixed trajectory lines (with simple local sensors detecting deviations from that line). However, bigger vehicles, higher speeds and special working environments present challenges. The same task becomes increasingly difficult in dynamically changing surroundings, such as collaborative working areas, i.e. areas where workers and vehicles can possibly collide.

Collision avoidance for autonomous vehicles in continuously changing, collaborative environments needs advanced intelligence for immediate decision making. As algorithms are still evolving, human assistance has to compensate in critical situations. Hence, current solutions need the continuous over-watch in dynamic (public) environments solving the collision problem from the driver side, i.e. by creating completely autonomous systems with assisted navigation of human driver (or remote driver) over-watch.

SUMMARY

It has been realized by the inventors that fixed trajectory solutions are not compatible with dynamically changing environments. Furthermore, collision avoidance in changing environments needs environment scanning sensors. These may be limited in capabilities, and the object recognition and situation detection algorithms are prone to fatal errors. In this category, specialized solutions to industrial situations exist, in which products are, however, without a global view, using direct proximity measurements, resulting in a partial solution, where 3D positioning is missing and blind spots may remain. It has further been realized by the inventors that these limited measurements may also result in basing location intelligence algorithms, and hence integration to cloud services potentially being of low impact.

According to some aspects of the present disclosure, there are provided a collision prevention system and method as well as a computer program product as set out in the independent claims. Preferred example implementations thereof are outlined in the dependent claims.

We describe a collision prevention system comprising: a localization system for determining positions of an autonomous vehicle and a human; and a collision determination unit coupled to or in communication with the localization system, wherein the collision determination unit is configured to determine, based on the determined positions of the autonomous vehicle and the human, whether a predefined condition for an anticipated collision of the autonomous vehicle with the human is met; wherein the collision prevention system is configured to: lock the autonomous vehicle if the predefined condition is met; alert the human for whom the predefined condition for colliding with the autonomous vehicle is met; and allow unlocking of the autonomous vehicle to be performed or initialized by the alerted human only.

An autonomous vehicle may hereby refer to an autonomously guided (i.e. driverless) vehicle, for example an autonomously guided industrial vehicle. The autonomous vehicle may be, for example, an autonomous car, a driverless car, a self-driving car, a robotic car etc. The autonomous vehicle may be, for example, a car, a truck, a container or any other moveable object which may, in some examples, be used for transporting goods and/or humans.

In some example implementations, the localization system may comprise an ultra-wideband (UWB)-based localization system. The localization system may hereby be based on a radio technology which may, for example, use a relatively low energy level for short-range, high-bandwidth communications over a relatively large part of the radio spectrum. UWB may therefore allow, in some examples, for transmissions which may not interfere with, for example, conventional narrowband and carrier wave transmission in the same frequency band.

The localization system may, in some other example implementations, comprise an optical unit, such as one or more cameras and/or scanners. However, it will be appreciated that variants according to the present disclosure are not limited to UWB and/or optically-based localization systems, but additionally or alternatively acoustic detection methods/devices, other wireless communication or other techniques (or combinations thereof) may be used in order to determine the positions of an autonomous vehicle and a human. Hence, various types of technologies based on which the localization system may function, or combinations thereof, may be used in some example implementations. These different types of technologies and combinations thereof may be used in any of the communications (i.e. not only for the localization system) as described throughout the present disclosure.

Locking of the autonomous vehicle may, in some examples, be performed by the collision prevention system wirelessly communicating with the autonomous vehicle and/or a navigation system comprised in, coupled to or in communication with the autonomous vehicle for controlling movement of the autonomous vehicle. In some variants, the communication of the collision prevention system with the autonomous vehicle and/or the navigation system may be based on radio-frequency communication. However, alternative communication techniques and means will be readily known to those with skill in the art.

Locking of the autonomous vehicle may, in some example implementations, comprise slowing down and/or stopping the autonomous vehicle. This may be preferable over, for example, merely changing a predetermined trajectory of the autonomous vehicle, which may however, in some examples, be performed in addition or alternatively to slowing down and/or stopping the autonomous vehicle.

In some variants, alerting the human for whom the predefined condition for the anticipated collision with the autonomous vehicle is met may comprise alerting the human using optical and/or acoustic means, such as, for example, light signals and/or a siren sound being output. Additionally or alternatively, mechanical means may be used to alert the human. Such mechanical means may, in some variants, comprise providing a vibration signal to a mobile device held by the human, which mobile device may alternatively or additionally be used in order to provide the optical and/or acoustic alert to the human, and which device may alternatively or additionally be used for unique identification of the human, as will be further outlined below.

Various techniques may be used in order for the alerted human to perform or initialize unlocking of the autonomous vehicle. Various types of unlocking procedures or techniques may hereby be used which may need, for example, physical presence and identification of the human.

In some example implementations, the unlocking by the alerted human may be based on the (localization) tag of the human being identified. Alternatively or additionally, methods including, but not limiting to reading a card and/or reading an iris of the human (using, for example, an iris scanner) and/or voice recognition may be used in order to identify the alerted human.

As will be outlined further below, in some examples, a certain button may need to be pressed by the alerted human, which button may, in some example implementations, be arranged on the autonomous vehicle or at a different, for example (more) safe, location. Additionally or alternatively, the button may be arranged on a device held by the alerted human, and/or an app may be provided on the alerted human's mobile device.

In some example implementations, the predefined condition may relate to a predicted (i.e. for a point of time in the future) relative distance between the autonomous vehicle and the human being below a predetermined threshold, which relative distance may, in some examples, be predicted based on the trajectories of the autonomous vehicle and/or the human. This prediction may, in some examples, take into account the likelihood of the autonomous vehicle and/or the human changing their predicted paths of movement and/or position. This may, in some examples, be based on historical data and/or based on an analysis of the current traffic situation in the area in which the autonomous vehicle and the human may move. The predefined condition may, in some examples, comprise a probability of collision exceeding a predetermined threshold probability. This probability may be calculated based on one or more of the predicted trajectories of the autonomous vehicle and/or the human, the current traffic situation in the area in which the autonomous vehicle and/or the human move, and one or more characteristics of the movement of the human (for example, the human turning around on the spot where he is standing or the like) and/or the autonomous vehicle (for example, the autonomous vehicle indicating with an indicator a change of direction in which the autonomous vehicle intends to drive).

As will be appreciated, the predefined condition being met for the anticipated collision may mean that if no actions are taken, for example, to change the current situation, for example, in view of the predicted trajectories of the autonomous vehicle and/or the human, a collision may occur.

The collision prevention system may be used by autonomous vehicles and workers in collaborative work areas for assisted collision avoidance in dynamic environments. By using variants of the collision prevention system according to the present disclosure, collaborative interaction between humans and autonomous vehicles in case of danger of collision may be used for unlocking an autonomous vehicle slowing down or stopping once the danger has passed. Autonomous navigation is hereby not replaced by assistance of a human driver, but by assistance of the endangered human(s) (e.g. pedestrian(s)).

The human for whom the predefined condition regarding the anticipated collision is met may be identified using various techniques, such as, but not limited to, one or more of optical means (for example scanning of an ID tag of the human), acoustical means and other wireless transmission means (for example using the mobile device of the human), some of which will be further outlined below.

In some example implementations, the collision prevention system is configured to determine a predicted path of movement of one or both of the autonomous vehicle and the human so as to allow the collision determination unit to determine whether the predefined condition regarding the anticipated collision is met. In some examples, the predicted path of movement of one or both of the autonomous vehicle and the human may be determined by the localization system. Alternatively or additionally, the predicted path of movement of one or both of the autonomous vehicle and the human may be determined by the collision determination unit.

As will be appreciated, whether the predefined condition is met may be determined, for example, in a scenario in which the autonomous vehicle is moving and the human is merely standing still in an area covered by the predicted trajectory of the autonomous vehicle. The collision prevention system according to some examples may additionally or alternatively be able to take into account the predicted trajectories of both of the autonomous vehicle and the human when determining whether the predefined condition is met.

In some variants of the collision prevention system, the collision determination unit is configured to determine whether the predefined condition is met based on position streams obtained via the localization system. This may allow, in particular, determining by the collision prevention system (in some examples, by the localization system and/or the collision determination unit) the predicted path of movement of one or both of the autonomous vehicle and the human. The position stream may hereby relate to a real-time position stream of one or both of the autonomous vehicle and the human. The (real-time) position stream may then be fed to the collision determination unit for determining whether the predefined condition is met.

In some example implementations of the collision prevention system, determining the positions of the autonomous vehicle and the human comprises determining relative positions between the autonomous vehicle and the human. Precision of determining whether the predefined condition is met may hereby be increased. In some variants, this information may be combined with that of absolute positions of the autonomous vehicle and the human, for further improvement of determining the positions used to determine whether the predefined condition is met.

In some variants of the collision prevention system, the localization system comprises one or more tags fixable to the autonomous vehicle and the human for determining one or both of (i) absolute positions of the autonomous vehicle and/or the human and (ii) relative positions between the autonomous vehicle and the human. The tags may, in some examples, be UWB-based tags or UWB-based units. Such a UWB-based tag or unit may, in some example implementations, provide position/location information of the tag/unit. In some variants, the UWB-based tag or unit may provide position/location information in addition to unique identification of the tag/unit at the same time by the localization platform. Hence, in some examples, the tag/unit, in particular the UWB-based tag/unit may provide IDs of the vehicle and the human in parallel with location information, for example if the ownership/affiliation of the tag/unit with the human/vehicle is registered in advance.

In some example implementations, the tags may comprise RFID tags.

Other wireless transmitters and/or receivers which may function as the tags will be readily known to those with skill in the art.

The tag(s) may, in some example implementations, be used in order to identify the human(s) (for example the human(s) for whom the predefined condition for the anticipated collision with the autonomous vehicle is met). Therefore, the tag(s) may be used in order to identify the human(s) which is (are) allowed to perform or initialize unlocking of the autonomous vehicle.

In some variants of the collision prevention system, the localization system comprises one or more anchors configured to perform positioning measurements of the autonomous vehicle and the human. In some example implementations, the one or more anchors may hereby be in communication with the one or more tags for determining the position of the autonomous vehicle and/or the human. The one or more anchors may hereby be arranged on parts of the infrastructure which may allow for overseeing particularly well the area in which the autonomous vehicle and the human may move.

In some example implementations, the one or more anchors are mobile anchors configured to determine a relative position between the autonomous vehicle and the human. One or more anchors may hereby be arranged on the autonomous vehicle, thereby allowing for the relative position between the autonomous vehicle and the human to be determined. As outlined above, in some variants, information regarding the relative position between the autonomous vehicle and the human may be combined with absolute position information of the autonomous vehicle and the human.

In some variants, the collision determination unit is configured to determine whether the predefined condition is met based on one or more maps, each of the maps depicting one or more time-varying zones in which one or both of the autonomous vehicle and the human can move. Physical changes in the environment in which the autonomous vehicle and the human can move and which environment is shown on the one or more maps may hereby be taken into consideration when determining whether the predefined condition is met for improved (near-)collision detection/prediction.

In some example implementations of the collision prevention system, the collision determination unit is configured to determine whether the predefined condition is met based on historical data relating to one or both of (i) collisions of autonomous vehicles with humans and (ii) determined positions or trajectories of the autonomous vehicles and humans (and/or movement characteristics of humans). This data, in particular data relating to the determined positions or trajectories of autonomous vehicles and humans, may, in some examples, have been obtained via the localization system of the collision prevention system. Taking historical data into account when determining whether the predefined condition is met may allow for a more precise collision prediction for a current scenario.

The historical data may, in some variants, be used in order to develop a machine learning algorithm. Therefore, in some example implementations of the collision prevention system, the collision determination unit is configured to determine whether the predefined condition is met based on a machine learning algorithm developed using the historical data.

In some further example implementations, the collision prevention system further comprises a vehicle connector for delivering locking and unlocking commands to the autonomous vehicle or a navigation system in communication with or coupled to the autonomous vehicle. Additionally or alternatively, in some examples, the collision prevention system further comprises a human connector for one or both of (i) delivering the alert to the human and (ii) receiving an unlocking command by the alerted human for unlocking of the autonomous vehicle to be performed or initialized.

As outlined above, various techniques may be used in order for the alerted human to perform or initialize unlocking of the autonomous vehicle. In some examples, a button may need to be pressed by the alerted human. The button may be arranged on the autonomous vehicle. Alternatively or additionally, the button may be arranged at a different, for example safe, location such that it may be ensured that the human is not put in a dangerous situation when the autonomous vehicle is unlocked. Additionally or alternatively, the button may be arranged on a device held by the alerted human, such as, for example the above-specified human connector (which may be a mobile device or an app stored in a mobile device).

In some examples, the human connector may be used to identify the alerted human who is allowed to perform or initialize unlocking of the autonomous vehicle.

In some example implementations, the collision prevention system is further configured to define a first danger zone around the autonomous vehicle or around a trajectory of the autonomous vehicle within which first danger zone the predefined condition can be met. The collision prevention system may hereby take into consideration one or more of historical data regarding collisions and/or positions of autonomous vehicles and humans, physical dimensions of the autonomous vehicle, and, for example, particularly dangerous areas in which the field of view is limited for the human. Defining a first danger zone may, in some examples, allow for the localization system to particularly concentrate on detecting any humans within the first danger zone.

The first danger zone may be defined based on one or more of absolute positions as measured, for example, by a pre-installed infrastructure, planned trajectory information, historical data sets and available communication channels between anchors and a localization platform. Alternatively (or additionally), relative distance information may be taken into consideration when defining the first danger zone, for example, based on proximity measurements as measured by a moving anchor on the vehicle and its velocity vector, using, for example, direct communication between the moving anchor and a tag which may be attached to the human, and the moving anchor and vehicle connector. An alert device connected to the human may hereby be activated.

In some example implementations, the collision prevention system may be configured to alert all humans located within the first danger zone. An early warning may hereby be used in order to inform all humans located within the first danger zone of the potential danger of collision with the autonomous vehicle.

In some variants, the collision prevention system is further configured to allow unlocking of the autonomous vehicle only if said unlocking is triggered (e.g. performed or initialized) by each of the humans located within the first danger zone. Each of the humans located in the first danger zone may hereby need to take one or both of the following actions in order for the autonomous vehicle to be unlocked: signaling their safety after relocating outside of the autonomous vehicle's reach and leaving the first danger zone defined with the lock-down alert.

In some further example implementations, the collision prevention system is configured to allow unlocking of the autonomous vehicle to be triggered by one or more of (i) pressing a physical button and/or reading an ID unique to the alerted human, (ii) a mobile device of the alerted human sending a safety signal to the collision determination unit, and (iii) detection of the alerted human leaving a vicinity of the autonomous vehicle or a predicted trajectory of the autonomous vehicle.

By allowing the autonomous vehicle to be unlocked only by the alerted human whose unique ID has been identified may ensure that only the human(s) who may be in a dangerous situation is (are) able to unlock the autonomous vehicle, rather than any other human(s) or, for example, another automated process. Using a mobile device may also ensure that only the alerted human may perform or initialize unlocking of the autonomous vehicle. It may be preferable for the autonomous vehicle to be unlocked only if the alerted human is detected to leave a vicinity (danger zone) of the autonomous vehicle or a predicted trajectory of the autonomous vehicle, such that unlocking may only be performed or initialized if the alerted human is not in a dangerous situation (i.e. in the danger zone) anymore.

In some variants, the collision prevention system is configured to define a second danger zone and to allow unlocking of the autonomous vehicle to be triggered only (i) if no humans are located within the second danger zone and/or (ii) by a signal sent from outside the second danger zone. Defining the second danger zone may allow reducing the probability of collisions between the autonomous vehicle and the humans even further.

In some example implementations of the collision prevention system, the collision determination unit is cloud-based. The cloud-based collision determination unit may refer to the collision determination unit being part of a cloud computing network for enabling access to shared pools of configurable resources (such as, for example, computer networks, servers, storage, applications and services). The cloud-based collision determination unit may hereby be provisioned over the internet. Data may be stored and processed by the cloud-based collision determination unit in the cloud computing network, thereby making use of the high processing power and high storage capacity of the cloud network.

In some example implementations of the collision prevention system, the localization system is partially cloud-based. Similar to the cloud-based collision determination unit, the partially cloud-based localization system may refer to parts of the localization system being part of a cloud computing network for enabling access to shared pools of configurable resources. Parts of the localization system which may be cloud-based may, in some examples, comprise a unit for determining (e.g. calculating and/or processing) positions of the autonomous vehicle and/or the human. As will be appreciated though, some parts of the localization system may be provided as hardware on site, such as, for example, cameras and/or other sensors.

In a related aspect according to the present disclosure, there is provided a method comprising: determining, based on real-time locations of a human and an autonomous vehicle, whether a predefined condition for an anticipated collision of the autonomous vehicle with the human is met; locking the autonomous vehicle if the predefined condition is met; and alerting the human for whom the predefined condition for colliding with the autonomous vehicle is met; wherein a subsequent unlocking of the autonomous vehicle is performable or initializable by the alerted human only.

In line with the above-identified aspects and example implementations of the collision prevention system, the method may be used, for example, by autonomous vehicles and humans (e.g. workers) in collaborative work areas for assisted collision avoidance in dynamic environments. Collaborative interaction between humans and autonomous vehicles in case of danger of collision may be used for unlocking the autonomous vehicles slowing down or stopping once the danger has passed. However, in order to ensure that no collisions will occur (or at least the probability thereof will be reduced), unlocking of the autonomous vehicle is performable or initializable by the alerted human only.

In some example implementations of the method, determining whether the predefined condition is met based on real-time locations of the human and the autonomous vehicle comprises determining whether the predefined condition is met based on a predicted path of movement of one or both of the autonomous vehicle and the human.

Further example implementations of the method essentially correspond to those variants and examples outlined above with regard to the collision prevention system.

We further describe a computer program product comprising program code portions for performing the above-identified methods and example implementations thereof when the computer program product is executed on one or more computing devices. The computer program product may hereby be stored on a computer-readable recording medium.

BRIEF DESCRIPTION OF THE DRAWINGS

These and other aspects of the present disclosure will now be further described, by way of example only, with reference to the accompanying figures, wherein like reference numerals refer to like parts, and in which.

DETAILED DESCRIPTION

The present disclosure may be applied to collaborative collision avoidance for, for example, industrial autonomous vehicles. The combination of the tag, anchor and platform with the locking/unlocking mechanism with advanced intelligence according to some example implementations as described herein may be particularly advantageous in order to avoid collision between autonomous vehicles and humans.

It has been realized by the inventors that fixed trajectory solutions are not compatible with dynamically changing environments. Furthermore, collision avoidance may make use of a real-time localization system for following moving objects with category/identity features. However, their precision may not be good enough in high-risk decisions, and they may not be able to replace the scanning sensors.

In view of the lack of a suitable detection method, the necessity of human driver assistance makes autonomous driving not entirely autonomous and it is not cost efficient either.

The location intelligence solutions as described herein may overcome these problems. In particular, the location intelligence solution as described herein may allow for collision avoidance of, for example, workers and autonomously guided industrial vehicles in dynamically changing environments. Real-time position information of both workers and vehicles with identities may be used. This way, the vehicle navigation algorithm may be able to use the assistance of the workers impacted, instead of, for example, the assistance of an additional human driver.

In some example implementations, the following steps may be taken in some scenarios. First of all, a near-collision situation may be detected probabilistically based on determined real-time locations of a vehicle and a human (e.g. worker). A conservative approach towards locking of the vehicle may then be taken. Impacted workers may thereafter be alerted. Finally, subsequent unlocking of the vehicle may be performed by those impacted workers only.

Centralized and distributed variants are presented throughout the present disclosure. Using direct proximity measurements and communication between vehicle and workers in the latter may help overcoming limitations of global solutions.

The collision prevention system as described herein may be used by autonomous vehicles and workers in collaborative work areas for assisted collision avoidance in dynamic environments. A secure communication infrastructure with known characteristics may need to be provided according to some example implementations.

Figure 1:
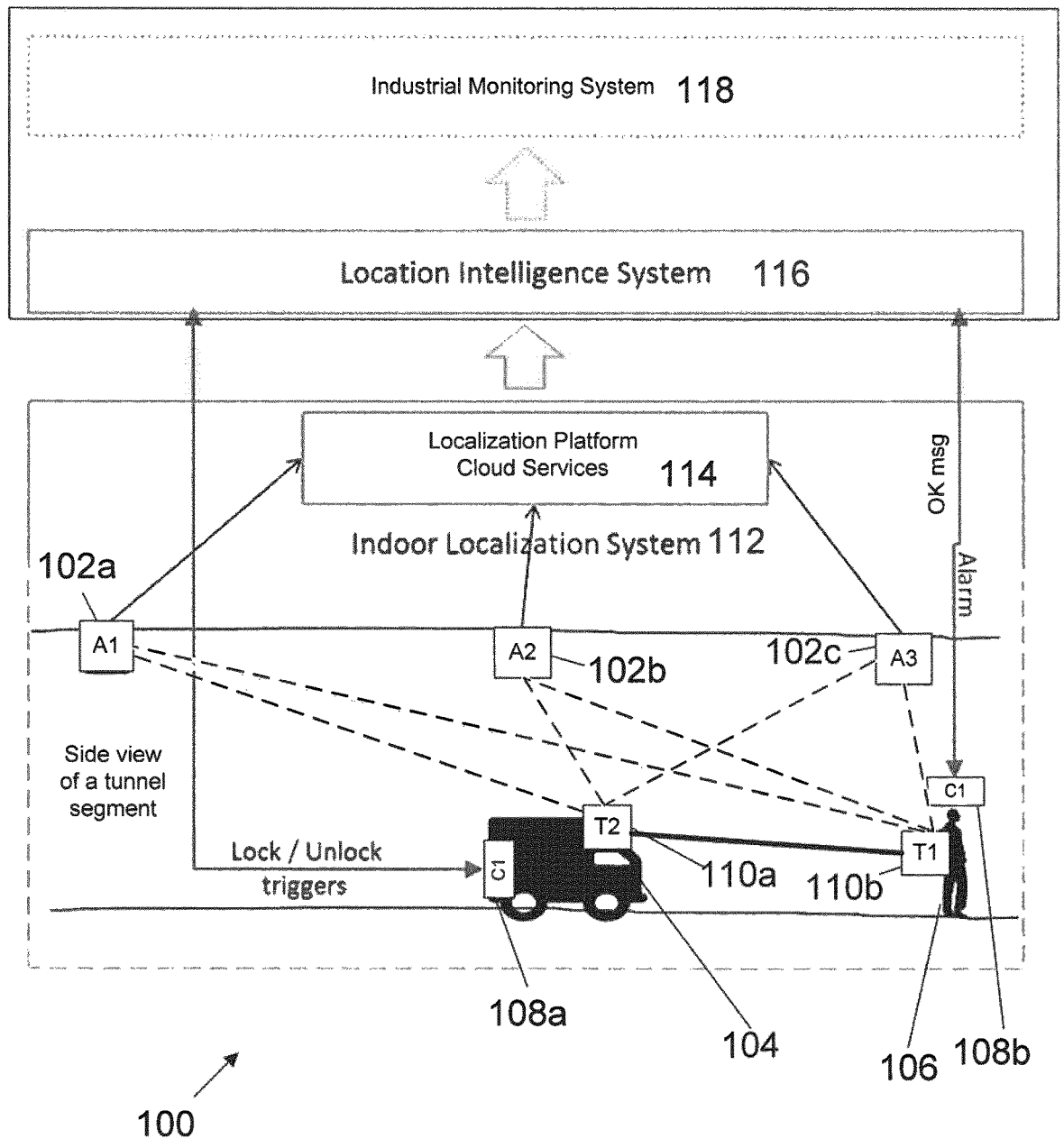
FIG. 1 shows a schematic illustration of a collision prevention system according to some example implementations as described herein.

FIG. 1 shows a schematic illustration of a collision prevention system 100 according to some example implementations as described herein.

In this example, the collision prevention system 100 comprises a location intelligence system 116. The location intelligence system 116 may be used for early collision detection and communication to vehicles and workers.

In some example implementations, the location intelligence system 116 may be proprietary. Alternatively, the location intelligence system 116 may integrate or be integrated in an existing intelligence system of an industrial monitoring system.

The location intelligence system 116 may, in some examples, provide feed for existing industrial monitoring or traffic control systems.

In this example, the location intelligence system 116 makes use of (i) maps with dynamic zone definitions of working areas, (ii) real-time position streams from the localization system, which is, in this example, an indoor localization system 112, (iii) a historical database for optional machine learning, and (iv) additional sensorial data from an optional industrial monitoring system.

In this example, the location intelligence system 116 is coupled to the indoor localization system 112.

The indoor localization system 112 may be used for positioning of both workers and vehicles, or direct proximity measurements between workers and vehicles.

In this example, the indoor localization system 112 comprises tags 110a and 110b, anchors 102a, 102b and 102c, and a platform which comprises, in this example, localization platform cloud services 114.

In this example, the anchors 102a, 102b and 102c are in communication with the localization platform cloud services 114. Data obtained via the anchors 102a, 102b and 102c regarding the position of the vehicle 104 and the human 106 may be provided to the localization platform cloud services 114 where the data may be processed in the cloud.

The anchors 102a, 102b and 102c may be building blocks of the localization infrastructure, performing the positioning measurements and communication with tags 110a and 110b and the platform. The anchors 102a, 102b and 102c may have fixed known positions for absolute positioning of the centralized solution and/or be mobile, e.g. installed on the vehicles for relative proximity measurement of worker tags 110b.

As outlined above, the anchors 102a, 102b and 102c are further in communication, in this example, with the tags 110a and 110b. This may allow for improved position determination of the vehicle 104 and the human 106, which/who may be uniquely identified via the tags 110a and 110b.

The tags 110a and 110b may be (small) devices fixed to workers and/or vehicles. They may be positioned and may be associated to a unique ID and may, in some examples, use a battery for power supply.

The platform (in this example the localization platform cloud services 114) of the indoor localization system 112 may be the central system, providing localization services. It may be responsible for communicating with the anchors 102a, 102b and 102c, performing collection of raw measurements, post-processing, and providing a real-time location stream to the location intelligence system 116.

In this example, the collision prevention system 100 further comprises connectors 108a and 108b which are in communication with the location intelligence system 116. The connectors 108a and 108b may be used for alerts and command actuation.

In this example, locking/unlocking triggering commands may be sent from the location intelligence system 116 to the connector 108a. The connector 108a may hereby be used to deliver locking/unlocking commands to the navigation system which is used to control the autonomous vehicle, or to the autonomous vehicle directly. Furthermore, the connector 108b may be used by the human 106 in order to send an OK message to the location intelligence system 116, signaling that the human 106 is safe. Furthermore, the location intelligence system 116 may, in this example, send an alarm (alert) to the connector 108b. The connector 108b may, in some examples, comprise a mobile phone application.

As shown in FIG. 1, the location intelligence system 116 may, in some examples, report and be integrated into an industrial monitoring system 118.

In this example, the indoor localization system 112 has two parts: the platform and the physical devices, e.g., tags on pedestrian workers (110b) and vehicles (110a), anchors infrastructure (102a, 102b and 102c) installed on a mine tunnel wall and the connectors 108a and 108b which may be a personal device and an engine controller, respectively.

The anchors 102a, 102b and 102c may send their raw measurements to the localization platform cloud services 114. Direct proximity measurement may be performed if tag 110a is replaced by a moving anchor. Location intelligence system 116 may handle a near-collision situation detection from localization input and navigation planning, sends alarms and locking triggers to the connectors 108a and 108b, and handles OK messages from the replying uniquely identified endangered workers. Finally it will only send an unlocking trigger to the vehicle 104 when the dangerous situation is dissolved completely.

As outlined above, the system may also report and be integrated into an industrial monitoring system 118. Although the location intelligence system 116 may be necessary for this logic, it is indicated in FIG. 1 that it may be part of the existing industrial monitoring system 118.

Methods as described herein may be adapted to global infrastructure-based or direct-measurement-based variants of the system and use various worker unlocking signals. The latter may, in some examples, be a fallback method used in parallel with the global infrastructure.

Figure 2:
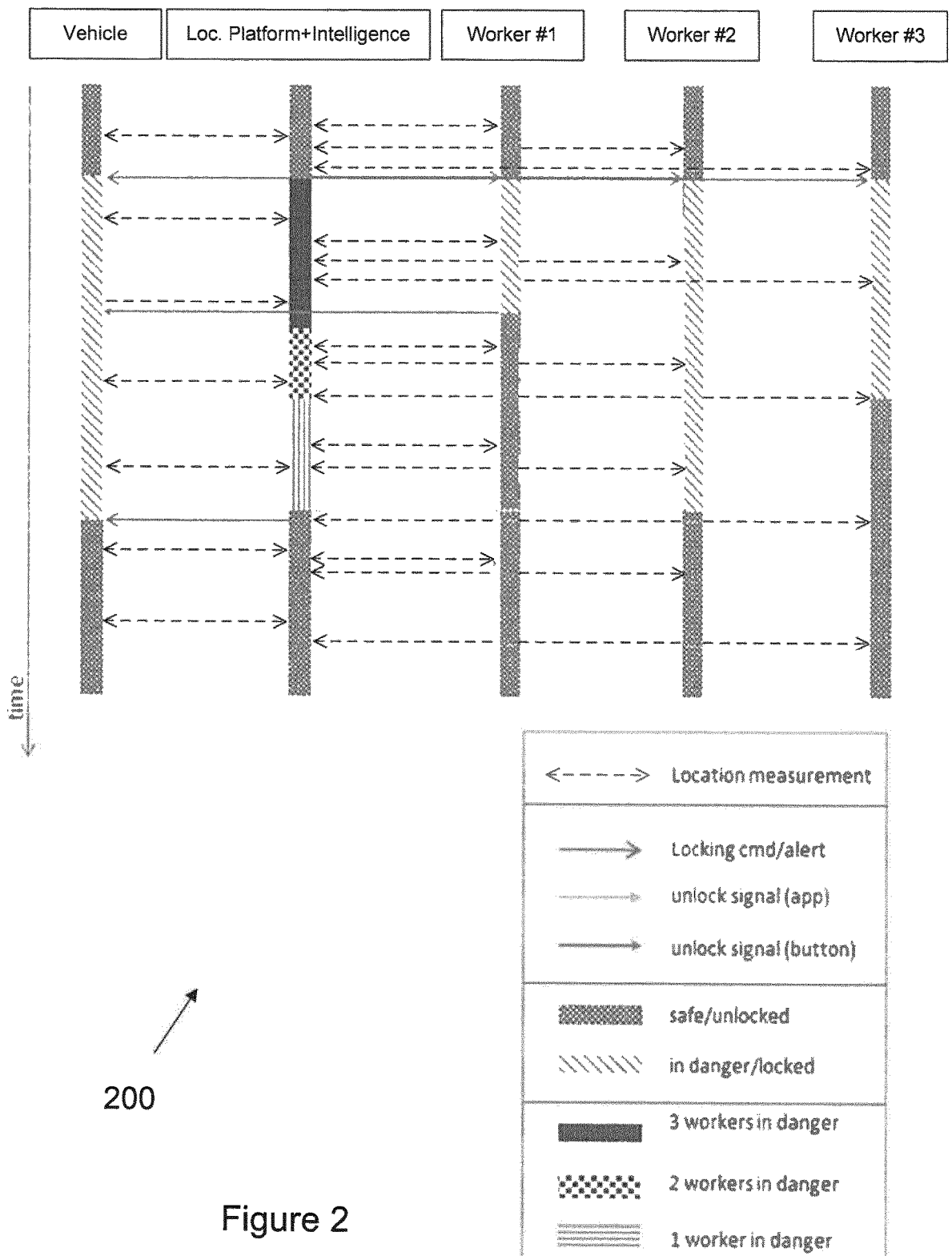
FIG. 2 shows an unlocking communication scheme according to some example implementations as described herein.

FIG. 2 shows an unlocking communication scheme 200 according to some example implementations as described herein.

Different example implementations can be deduced from FIG. 2.

In some examples, a common part of the different example implementations of the methods may be that once a near-collision situation is detected (i.e. a collision may be predicted if no measures are taken to change, for example, a predetermined path of the autonomous vehicle), a lock-down may be initiated in the navigation of the autonomous vehicle. Furthermore, a local danger zone may be defined conservatively, considering one or more of (i) compensation for uncertainty in localization measurements, (ii) a reaction time of a closed loop vehicle control, (iii) the planned trajectory of the vehicle, and (iv) positions and velocities, and learned movement characteristics of the (near-by) workers. Movement characteristics may hereby, in some examples, refer to common speeds (for example average speeds) of movement of works and/or direction changes of workers.

Common to the different example implementations may further be to send an alert signal to the identified worker(s) located within the danger zone. Furthermore, the vehicle may be unlocked once each involved work has taken, for example, at least one of the following actions: signaling their safety after relocating outside of the reach of the autonomous vehicle, and leaving the danger zone (which may be defined with the lock-down alert).

The different example implementations may vary based on positioning and defining local danger zones. On the one hand, absolute positions as measured, for example, by a pre-installed infrastructure, planned trajectory information, historical datasets and available communication channels between anchors and the localization platform may form the basis for positioning and defining local danger zones. Alternatively, only the relative distance, e.g. proximity measurements as measured by a moving anchor on the vehicle and its velocity vector, using direct communication between the moving anchor and the worker tag (e.g., activating a connected alert device on the worker), and the moving anchor and the vehicle connector may be taken into consideration when positioning and defining local danger zones.

The different example implementations may further vary based on the types of worker safety/unlocking signals. In some examples, pressing of a physical button and/or reading of, for example, the unique ID badge of the worker by a separate device may be used as such signals. Alternatively (or additionally), a mobile device application may send a safety signal to the location intelligence system that may send an unlocking signal to the vehicle when no more endangered workers are detected. Furthermore, alternatively (or additionally), detection of a worker leaving the danger zone may cancel an alert.

In any case, a second level of danger zone may be defined by the location intelligence system. Unlocking may only be done when no workers are located within this 'red' zone.

In the example depicted in FIG. 2, three endangered workers and one vehicle are considered in this scenario.

All locations may be periodically measured and known in the central application via the localization platform. Once the central logic of the location intelligence system detects a high probability of collision (i.e. higher than a predetermined threshold) or generally that the predefined condition for an anticipated collision between the autonomous vehicle and the worker(s), the vehicle is locked, and all endangered workers receive alerts.

The vehicle only becomes unlocked after all three workers signaled their own safety via one or more of (i) pressing a button on the stopped vehicle where they are identified by their unique location tag ID, (ii) sending a signal on a mobile phone application, and (iii) exiting the conservatively defined danger zone.

A higher level of security may be achieved by utilizing a second level danger zone. Unlocking may require a worker signal from outside of the second level danger zone.

Figure 3:
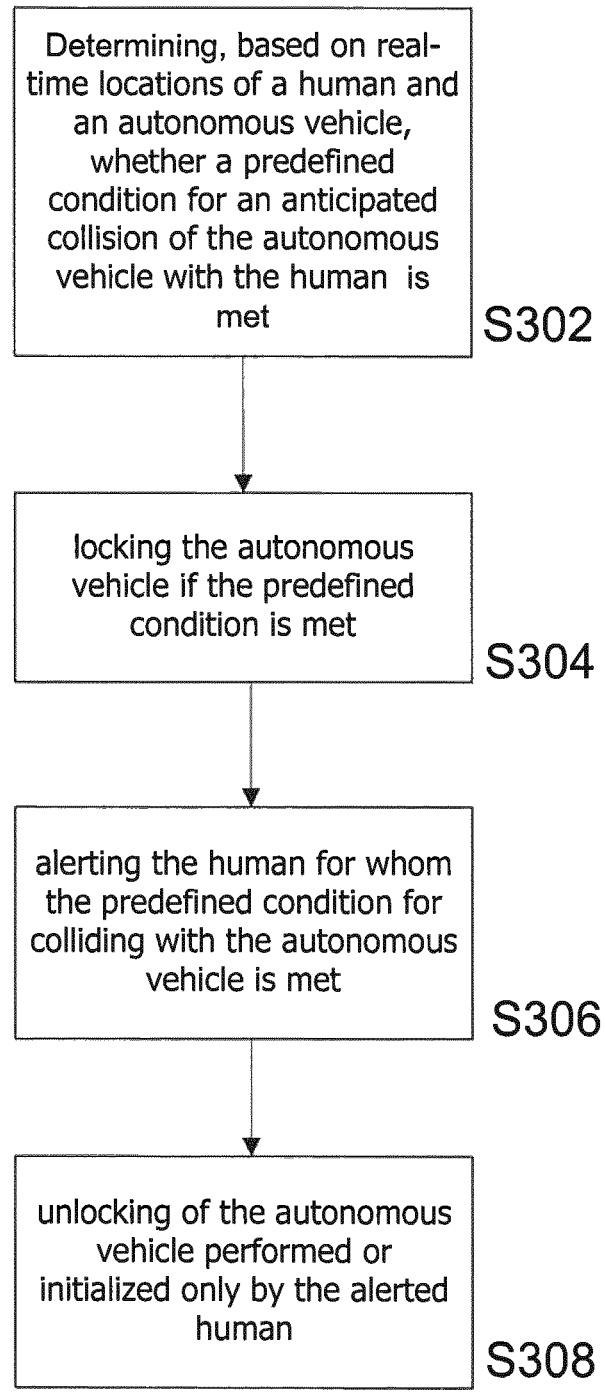
FIG. 3 shows a flow-diagram of a method according to some example implementations as described herein.

FIG. 3 shows a flow-diagram of a method 300 according to some example implementations as described herein.

In this example, it is determined at step S302, based on real-time locations of a human and an autonomous vehicle, whether a predefined condition for an anticipated collision of the autonomous vehicle with the human is met.

The autonomous vehicle is then locked at step S304 if the predefined condition is met.

The human for whom the predefined condition for colliding with the autonomous vehicle is met is then alerted at step S306.

In some examples, unlocking of the autonomous vehicle may be performed or initialized at step S308 by the alerted human only.

Figure 4:
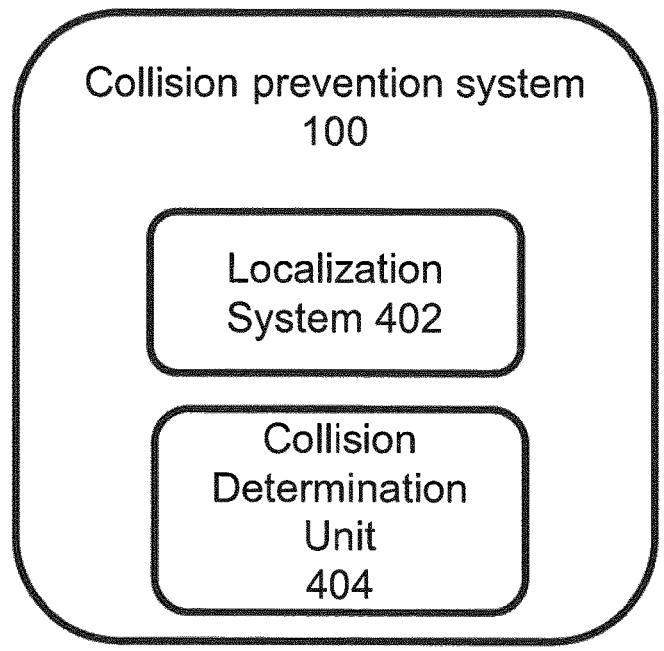
FIG. 4 shows a block-diagram of a collision prevention system according to some example implementations as described herein.

In order to realize the above-identified example implementations, a collision prevention system 100 as shown in FIG. 4 is provided.

In this example, the collision prevention system 100 comprises a localization system 402 configured to determine positions of an autonomous vehicle and a human.

The collision prevention system 100 further comprises a collision determination unit 404 coupled to or in communication with the localization system 402, whereby the collision determination unit 404 is configured to determine a predefined condition for an anticipated collision of the autonomous vehicle with the human is met based on the determined positions (and/or the predicted trajectories) of the autonomous vehicle and the human.

In some examples, the localization system 402 comprises the indoor localization system 112. Additionally or alternatively, the collision determination unit 404 may comprise, according to some variants, the location intelligence system 116.

Figure 5:
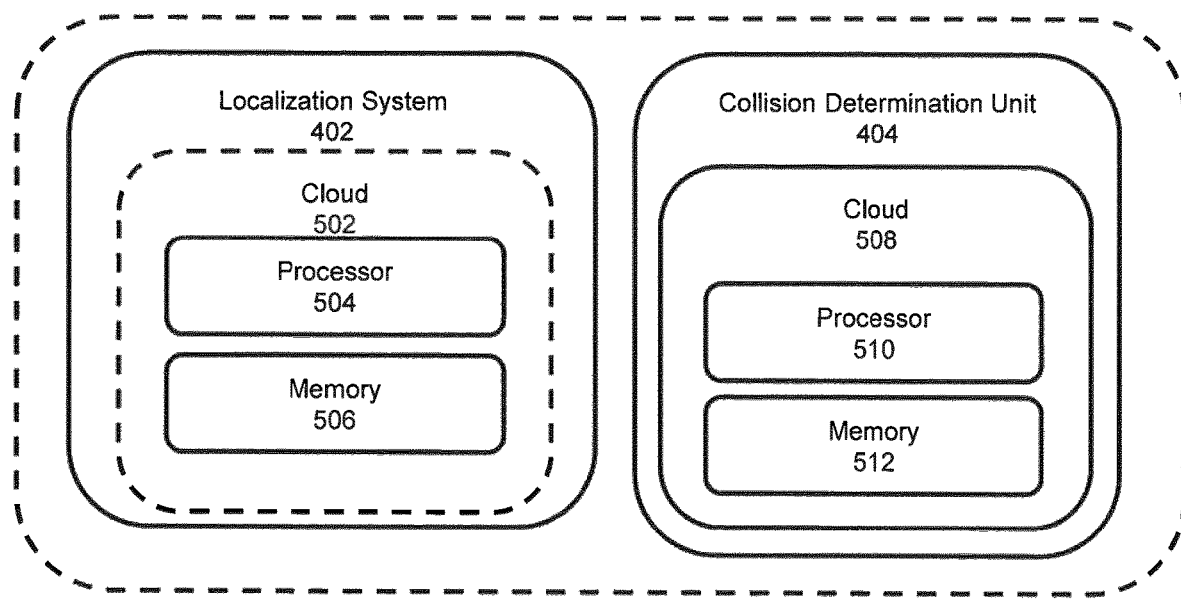
FIG. 5 shows a localization system and a collision determination unit according to some example implementations as described herein.

As shown in FIG. 5, the localization system 402 may be partially cloud-based, as indicated by the cloud 502. In this example, the localization system 402 comprises a processor 504 and memory 506. Furthermore, in this example, the processor 504 and memory 506 are comprised in cloud 502.

In this example, the collision determination unit 404 is cloud-based, as indicated by the cloud 508. In this example, the collision determination unit 404 comprises a processor 510 and memory 512 which are, in this example, comprised in cloud 508.

As will be appreciated, cloud 502 and cloud 508 may, in some examples, be integral to a single cloud. Additionally or alternatively, processor 504 and processor 510 may be integral to a single processor. Additionally or alternatively, memory 506 and memory 512 may be integral to a single memory.

Multiple locations may deploy separate physical infrastructures, and may still use central cloud micro-services. Industrial safety use-cases, however, may have their own dedicated cloud infrastructure for low delay, near real-time communication. The choice may depend on the speed of vehicles and the remoteness of the location in which the system may be implemented.

As outlined above, the location intelligence as described herein may be used in indoor industrial settings. By using indoor localization infrastructure for both workers and autonomous vehicles, their collaborative interaction in case of danger of collision may be used for unlocking of a vehicle slowing down or stopping once the danger has passed. Perfect autonomous navigation is not replaced by assistance of a human driver, but by assistance of the endangered pedestrians. This may be achieved by centralized and direct communication variants.

Variants and example implementations of systems and methods as described herein may enable use of autonomously guided vehicles without human driver assistance in high-risk zones, e.g., collaborative and dynamic work areas in a factory or mine.

Systems and methods as described herein may further be used in indoor industrial areas.

The indoor localization as described herein may replace methods like environment scanning (LIDAR or image processing).

The solution described herein enables use of probabilistic location measurements for collision avoidance, as worker assistance may compensate missing information.

Situation awareness and reactive navigation decisions may avoid under-optimal general speed restrictions. For example collaborative work areas with a low number of workers may not have the same slow-down requirements.

Example implementations as described herein may further allow easy installation of infrastructure and provide the option of direct proximity measurements.

Examples as described herein may be provided as a complete solution, or may be integrated into an existing location intelligence and monitoring system.

No doubt many other effective alternatives will occur to the skilled person. It will be understood that the present disclosure is not limited to the described variants and encompasses modifications apparent to those skilled in the art and lying within the scope of the claims appended hereto.

The invention claimed is:

1. A collision prevention system, comprising:
a localization system configured to determine positions of an autonomous vehicle and a human; and
a collision determination unit coupled to or in communication with the localization system, wherein the collision determination unit is configured to determine, based on the determined positions of the autonomous vehicle and the human, whether a predefined condition for an anticipated collision of the autonomous vehicle with the human is met;
wherein the collision prevention system is configured to:
lock the autonomous vehicle if the predefined condition is met;
alert the human for whom the predefined condition for colliding with the autonomous vehicle is met; and
allow unlocking of the autonomous vehicle to be performed or initialized by the alerted human only.

2. The collision prevention system of claim 1, wherein the collision prevention system is configured to determine a predicted path of movement of one or both of the autonomous vehicle and the human to determine whether the predefined condition is met.

3. The collision prevention system of claim 1, wherein the collision determination unit is configured to determine whether the predefined condition is met based on position streams obtained via the localization system.

4. The collision prevention system of claim 1, wherein localization system is configured to determine the positions of the autonomous vehicle and the human by determining relative positions between the autonomous vehicle and the human.

5. The collision prevention system of claim 1, wherein the localization system comprises one or more tags fixable to the autonomous vehicle and the human for determining:
absolute positions of the autonomous vehicle and/or the human; and/or
relative positions between the autonomous vehicle and the human.

6. The collision prevention system of claim 1, wherein the localization system comprises one or more anchors configured to perform positioning measurements of the autonomous vehicle and the human.

7. The collision prevention system of claim 6:
wherein the localization system comprises one or more tags fixable to the autonomous vehicle and the human for determining:
absolute positions of the autonomous vehicle and/or the human; and/or
relative positions between the autonomous vehicle and the human;
wherein the one or more anchors are in communication with the one or more tags for determining the position of the autonomous vehicle and/or the human.

8. The collision prevention system of claim 6, wherein the one or more anchors are mobile anchors configured to determine a relative position between the autonomous vehicle and the human.

9. The collision prevention system of claim 1, wherein the collision determination unit is configured to determine whether the predefined condition is met based on one or more maps, each of the maps depicting one or more time-varying zones in which one or both of the autonomous vehicle and the human can move.

10. The collision prevention system of claim 1, wherein the collision determination unit is configured to determine whether the predefined condition is met based on historical data relating to:
collisions of autonomous vehicles with humans; and/or
determined positions or trajectories of the autonomous vehicles and humans.

11. The collision prevention system of claim 10, wherein the collision determination unit is configured to determine whether the predefined condition is met based on a machine learning algorithm developed using the historical data.

12. The collision prevention system of claim 1, wherein the collision prevention system is further configured to define a first danger zone around the autonomous vehicle, or around a trajectory of the autonomous vehicle, within which first danger zone it is possible for the predefined condition to be met.

13. The collision prevention system of claim 12, wherein the first danger zone is defined taking into consideration:
an uncertainty in position determination of one or both of the autonomous vehicle and the human;

a reaction time of a closed loop vehicle control;
a prediction of the trajectory of the autonomous vehicle; and/or
one or more movement characteristics of the human.

14. The collision prevention system of claim 12, wherein the collision prevention system is further configured to alert all humans located within the first danger zone.

15. The collision prevention system of claim 14, wherein the collision prevention system is further configured to allow unlocking of the autonomous vehicle only if it is triggered by each of the humans located within the first danger zone.

16. The collision prevention system of claim 1, wherein the collision prevention system is configured to allow unlocking of the autonomous vehicle to be triggered by:
   pressing a physical button and/or reading an ID unique to the alerted human;
   a mobile device of the alerted human sending a safety signal to the collision determination unit; and/or
   detection of the alerted human leaving a zone which is within reach by the autonomous vehicle or by a predicted trajectory of the autonomous vehicle.

17. The collision prevention system of claim 1, wherein the collision prevention system is configured to define a second danger zone and to allow unlocking of the autonomous vehicle to be triggered only:
   if no humans are located within the second danger zone; and/or
   by a signal sent from outside the second danger zone.

18. A method, comprising:
   determining, based on real-time locations of a human and an autonomous vehicle, whether a predefined condition for an anticipated collision of the autonomous vehicle with the human is met;
   locking the autonomous vehicle if the predefined condition is met;
   alerting the human for whom the predefined condition for colliding with the autonomous vehicle is met;
   wherein a subsequent unlocking of the autonomous vehicle is performable or initializable by the alerted human only.

19. The method of claim 18, wherein determining whether the predefined condition is met based on real-time locations of the human and the autonomous vehicle comprises determining whether the predefined condition is met based on a predicted path of movement of the autonomous vehicle and/or the human.

20. A non-transitory computer readable recording medium storing a computer program product for preventing collisions between an autonomous vehicle and a human, the computer program product comprising program instructions which, when run on processing circuitry of a collision prevention system, causes the collision prevention system to:
   determine based on real-time locations of a human and an autonomous vehicle, whether a predefined condition for an anticipated collision of the autonomous vehicle with the human is met;
   lock the autonomous vehicle if the predefined condition is met;
   alert the human for whom the predefined condition for colliding with the autonomous vehicle is met;
   wherein a subsequent unlocking of the autonomous vehicle is performable or initializable by the alerted human only.

* * * * *